United States Patent
Tsuchiya

(10) Patent No.: US 6,915,200 B2
(45) Date of Patent: Jul. 5, 2005

(54) ABNORMALITY DETERMINING DEVICE FOR LONGITUDINAL ACCELERATION SENSOR FOR VEHICLE AND METHOD THEREOF

(75) Inventor: Tomoyuki Tsuchiya, Tomi (JP)

(73) Assignee: Nissin Kogyo Co., Ltd., Nagano (JP)

( * ) Notice: Subject to any disclaimer, the term of this patent is extended or adjusted under 35 U.S.C. 154(b) by 108 days.

(21) Appl. No.: 10/667,971

(22) Filed: Sep. 23, 2003

(65) Prior Publication Data

US 2004/0236484 A1 Nov. 25, 2004

(30) Foreign Application Priority Data

Sep. 24, 2002 (JP) ........................................ 2002-277199

(51) Int. Cl.$^7$ ............................................ G01M 17/00
(52) U.S. Cl. ............................. 701/70; 701/29; 702/87; 702/141; 280/735; 303/122.06; 303/177
(58) Field of Search .......................... 303/122.06, 177, 303/183, 122.05; 701/29, 33, 45, 47, 70; 702/87, 141; 307/10.1; 180/232, 282; 340/436; 73/1.38, 1.39; 280/735

(56) References Cited

U.S. PATENT DOCUMENTS

| | | | | |
|---|---|---|---|---|
| 5,203,821 A | * | 4/1993 | Tanaka | 73/1.38 |
| 5,671,981 A | * | 9/1997 | Sasaki et al. | 303/122.06 |
| 6,052,642 A | * | 4/2000 | Wagner et al. | 701/70 |
| 6,055,841 A | * | 5/2000 | Yamada et al. | 73/1.38 |
| 6,305,760 B1 | * | 10/2001 | Otake | 303/122.05 |
| 2003/0004625 | * | 1/2003 | Kachel et al. | 701/34 |

FOREIGN PATENT DOCUMENTS

| | | |
|---|---|---|
| EP | 0 655 376 A1 | 5/1995 |
| EP | 1 013 523 A2 | 6/2000 |
| JP | 04 110267 | 4/1992 |
| JP | 9-142281 | 6/1997 |
| WO | WO 02/32732 A1 | 4/2002 |

* cited by examiner

Primary Examiner—Thomas G. Black
Assistant Examiner—Tuan C To
(74) Attorney, Agent, or Firm—Greenblum & Bernstein, P.L.C.

(57) ABSTRACT

An abnormality determining device for a longitudinal acceleration sensor for a vehicle has: a first acceleration estimating unit based on a wheel speed; a second acceleration estimating unit based on the throttle angle; a determination-permission deciding unit for setting a determination-permission region based on the estimated values of the first and second acceleration estimating unit so as to output a determination-permission signal when a deviation between the vehicle acceleration by the first acceleration estimating unit and by the second acceleration estimating unit is within a predetermined value; and a determining unit for setting an abnormality determining region based on the vehicle acceleration estimated by the second acceleration estimating unit and for determining that the longitudinal acceleration sensor is abnormal, if the output value of the longitudinal acceleration sensor exists in the abnormality determining region for a predetermined time or longer in a state that a determination-permission signal is output.

2 Claims, 3 Drawing Sheets

ABNORMALITY DETERMINING DEVICE FOR LONGITUDINAL ACCELERATION SENSOR FOR VEHICLE AND METHOD THEREOF

BACKGROUND OF THE INVENTION

1. Field of the Invention

The present invention relates to an improvement of a device for deciding abnormality of a longitudinal acceleration sensor which is employed for e.g. a brake fluid pressure control device for a vehicle.

2. Description of the Related Art

Conventionally, a longitudinal acceleration sensor was used to detect the longitudinal acceleration of a vehicle for e.g. a brake fluid pressure control device for a vehicle (for example, see JP-A-9-142281).

If such a longitudinal acceleration sensor falls in an abnormal condition, the control of brake fluid pressure may not be performed suitably. Therefore, the abnormality of the longitudinal acceleration sensor must be decided. In this case, as for a vehicle provided with a driven wheel, the estimated body speed which is computed based on a driven wheel speed can be adopted as a standard for deciding the abnormality. However, as for a four-wheel drive vehicle, the driven wheel speed cannot be acquired. In addition, on uphill running, the inclination of the vehicle in the lengthwise direction affects the detected value of the longitudinal acceleration sensor. In such a case, it is necessary to avoid deciding the abnormality of the longitudinal acceleration sensor.

SUMMARY OF THE INVENTION

The present invention has been accomplished in view of such a circumstance. An object of the present invention is to provide an abnormality determining device for a longitudinal acceleration sensor for a vehicle which can decide the abnormality of the longitudinal acceleration sensor for a vehicle not capable of acquiring a driven wheel speed and can avoid erroneous decision due to uphill/downhill running.

In order to attain the above object, the present invention is an abnormality determining device for a longitudinal acceleration sensor for a vehicle having: a first acceleration estimating unit for estimating a vehicle acceleration based on a wheel speed; a second acceleration estimating unit for estimating another vehicle acceleration based on the throttle angle of an engine; a determination-permission deciding unit for setting a determination-permission region based on the estimated values of the first and second acceleration estimating unit so as to output a determination-permission signal when a deviation between the vehicle acceleration estimated by the first acceleration estimating unit and the vehicle acceleration estimated by the second acceleration estimating unit is within a predetermined value; and a determining unit for setting an abnormality determining region based on the vehicle acceleration estimated by the second acceleration estimating unit and for determining that the longitudinal acceleration sensor is abnormal, if the output value of the longitudinal acceleration sensor exists in the abnormality determining region for a predetermined time or longer in a state that the determination-permission deciding unit outputs a determination-permission signal. In addition to this, a four-wheel drive vehicle having the abnormality determining device as set forth in the above construction.

Further, An abnormality determining method for a longitudinal acceleration sensor for a vehicle having steps of: estimating a first vehicle acceleration based on a wheel speed; estimating a second vehicle acceleration based on the throttle angle of an engine; outputting a determination-permission signal when a deviation between the first vehicle acceleration and the second vehicle acceleration is within a predetermined value; setting a determination-permission region based on the first and second vehicle acceleration; setting an abnormality determining region based on the second vehicle acceleration; and determining that the longitudinal acceleration sensor is abnormal, if the output value of the longitudinal acceleration sensor exists in the abnormality determining region for a predetermined time or longer in a state that a determination-permission signal is output.

In accordance with such a configuration, the longitudinal acceleration of the vehicle will change according as the throttle angle of an engine changes. Therefore, the second acceleration estimating unit estimates the vehicle acceleration based on the engine throttle angle. The determining unit decides that the output value of the longitudinal acceleration sensor exists in the abnormality determining region determined based on the estimated vehicle acceleration for a predetermined time or longer. Thus, the determining unit can exactly decide the abnormality of the longitudinal acceleration sensor for the vehicle which cannot acquire the driven wheel speed. In addition, on the uphill/downhill running, the deviation between the vehicle acceleration estimated by the first acceleration estimating unit and the vehicle acceleration estimated by the second acceleration estimating unit increases. Therefore the determining unit decides the abnormality of the longitudinal acceleration sensor only when the deviation between these estimated values is within a predetermined value. The determining unit does not make the decision of abnormality when the inclination of the vehicle on the uphill/downhill running affects the detected value of the longitudinal acceleration sensor, thereby avoiding the erroneous decision due to the uphill/down hill running.

DETAILED DESCRIPTION OF THE PREFERRED EMBODIMENTS

Figure 1:
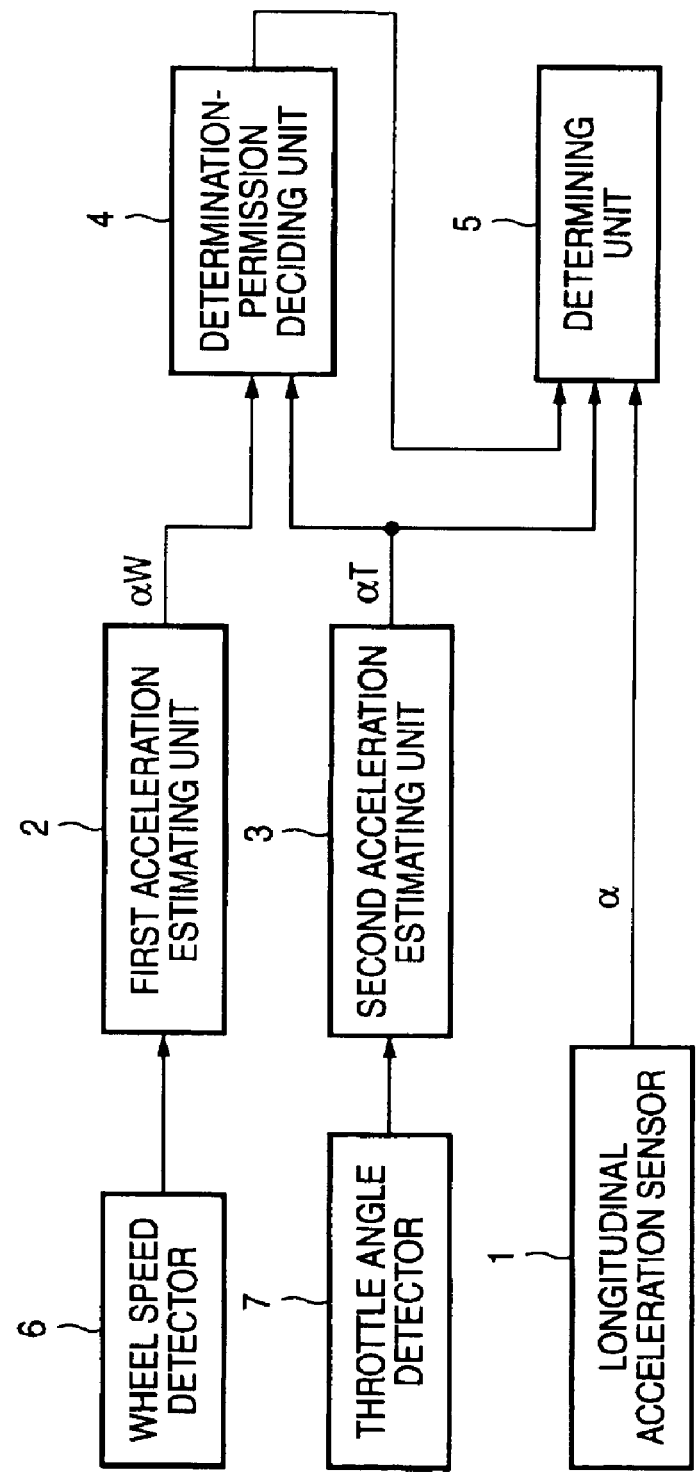
FIG. 1 is a block diagram showing the arrangement of an abnormality determining device according to the present invention.

Now referring to the drawings, an explanation will be given of an embodiment of the present invention.

Figure 2:
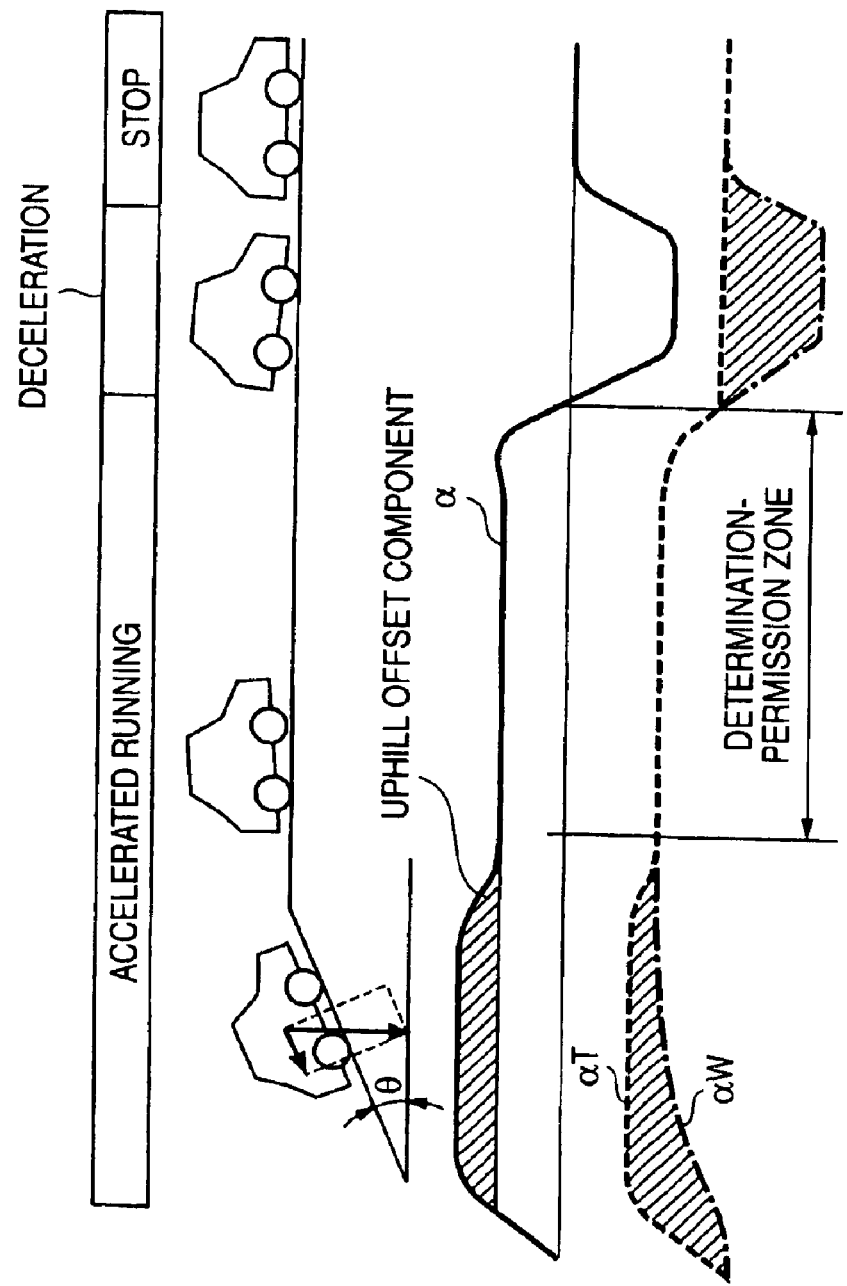
FIG. 2 is a view showing changes in the vehicle acceleration when a vehicle runs along an uphill or flat road.
Figure 3:
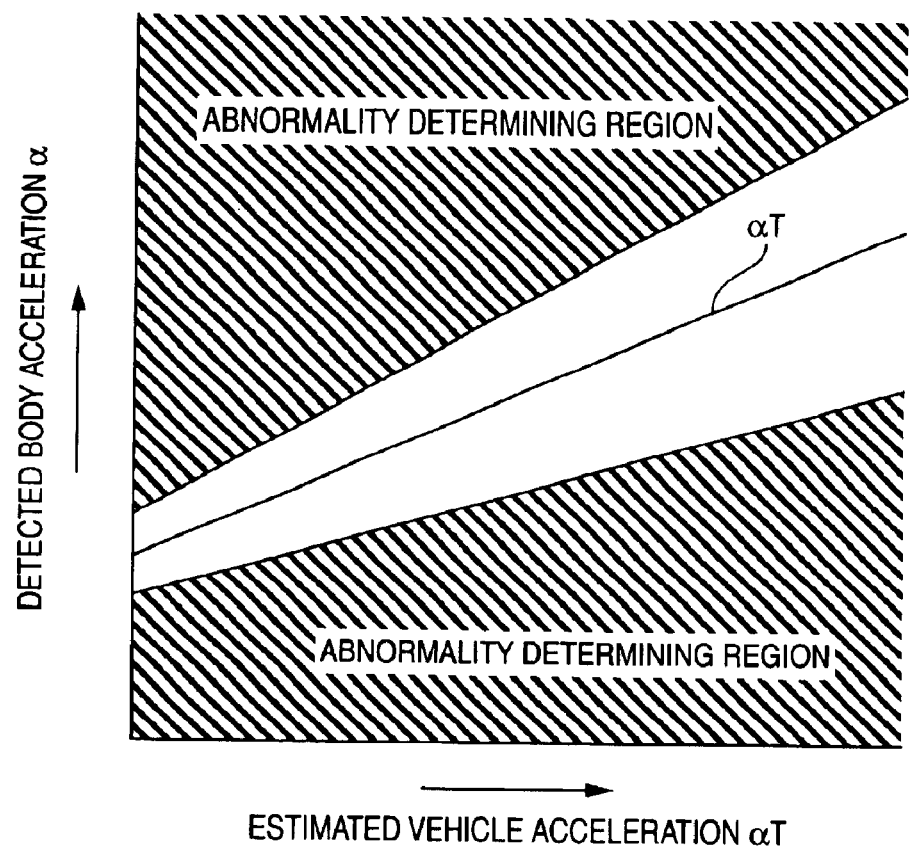
FIG. 3 is a graph showing an abnormality determining region.

FIGS. 1 to 3 show an embodiment of the present invention respectively. FIG. 1 is a block diagram showing the arrangement of an abnormality determining device. FIG. 2 is a view showing changes in a vehicle acceleration when a vehicle runs along an uphill and a flat road. FIG. 3 is a view showing an abnormality determining region.

In FIG. 1, the abnormality determining device for deciding the abnormality of a longitudinal acceleration sensor 1 mounted on a vehicle includes a first acceleration estimating unit 2 for estimating a vehicle acceleration, a second acceleration estimating unit 3 for estimating another vehicle acceleration, a determination-permission deciding unit 4 for setting a determination-permission region based on estimated values of the first and second acceleration estimating unit 2 and 3, and a determining unit 5 for deciding the abnormality of the longitudinal acceleration sensor 1 while the determination-permission deciding unit outputs a determination-permission signal.

The first acceleration estimating unit 2 serves to estimate a vehicle acceleration αW based on the wheel speed which is detected by a wheel speed detector 6. The second acceleration estimating unit 3 serves to estimate another vehicle acceleration αT based on the throttle angle of an engine which is detected by a throttle angle detector 7. The vehicle accelerations αW and αT estimated by the first and second acceleration estimating unit 2 and 3 are supplied to a determination-permission deciding unit 4. The determination-permission deciding unit 4 outputs a determination-permission signal when the absolute value (|αW−αT|) of the deviation between both body speeds αW and αT is within of a predetermined value.

Meanwhile, when a vehicle moves from an uphill to a flat road, on the uphill running, a detected value α with an added shaded offset component as shown in FIG. 2 is produced from the longitudinal acceleration sensor 1. In this case, since the vehicle acceleration αW estimated by the first acceleration estimating unit 2 is lower than the vehicle acceleration αT estimated by the second acceleration estimating unit 3, the difference (αT−αW) between both vehicle accelerations αW and αT exceeds the predetermined value. During vehicle deceleration also, since the vehicle acceleration αW estimated by the first acceleration estimating unit is lower than the vehicle acceleration αT estimated by the second acceleration estimating unit 3, the difference (αT−αW) between both vehicle accelerations αW and αT exceeds a predetermined value. In short, if the difference αT−αW exceeds the predetermined value, it is possible to determine that the vehicle runs along the uphill or decelerates. Further, on downhill running, on the contrary to the case of the uphill running, the detected value α with a subtracted offset component is produced from the longitudinal acceleration sensor 1. In this case, since the vehicle acceleration αT estimated by the second acceleration estimating unit 3 is lower than the vehicle acceleration αT estimated by the first acceleration estimating unit 2, if the difference (αW−αT) between both vehicle accelerations αW and αT exceeds a predetermined value, it is possible to decide that the vehicle is running along the downhill.

Accordingly, the determination-permission deciding unit 4 outputs a determination-permission signal in a determination-permission zone where the vehicle runs along the flat road other than the uphill and downhill and also in a non-decelerated condition.

The determining unit 5 is supplied with the detected value α from the longitudinal acceleration sensor 1 and the output signal from the determination-permission deciding unit 4 and decides whether or not the longitudinal acceleration sensor is abnormal while the determination-permission deciding unit 4 outputs the determination-permission signal.

Meanwhile, as seen from FIG. 3, the determining unit 5 provides an abnormality determining region which is obtained by multiplying the vehicle acceleration αT estimated by the second acceleration estimating unit 3 by a prescribed constant. The determining unit 5 decides that the longitudinal acceleration sensor 1 is abnormal if the output value a from the longitudinal acceleration sensor 1 exists in the abnormality determining region for a predetermined time or longer.

The operation of the present invention will be explained below. The longitudinal acceleration of the vehicle will change according as the throttle angle of an engine changes. Therefore, the second acceleration estimating unit 3 estimates the vehicle acceleration αT based on the engine throttle angle. The determining unit 5 decides that the output value α of the longitudinal acceleration sensor 1 exists in the abnormality determining region determined based on the vehicle acceleration αT for a predetermined time or longer. Thus, the determining unit can exactly decide the abnormality of the longitudinal acceleration sensor 1 for the vehicle which cannot acquire the driven wheel speed.

In addition, on the uphill running, the deviation between the vehicle acceleration αW estimated by the first acceleration estimating unit 2 based on the wheel speed and the vehicle acceleration αT estimated by the second acceleration estimating unit 3 based on the throttle angle of the engine increases. Therefore, the determination-permission deciding unit 4 outputs the determination-permission signal only when the deviation between these estimated values is no larger than the predetermined value. In this state, the determining unit 5 decides the abnormality of the longitudinal acceleration sensor 1. The determining unit 5 does not make the decision of abnormality when the inclination of the vehicle on the uphill/downhill running affects the detected value α of the longitudinal acceleration sensor 1, thereby avoiding the erroneous decision due to the uphill/downhill running.

Although the embodiment of the present invention has been explained, the present invention should not be limited to the embodiment, but can be realized in various modifications of design without departing the scope of the present invention defined in the claims.

As understood from the description, in accordance with the present invention, the abnormality of the longitudinal acceleration sensor can be exactly decided for the vehicle which cannot acquire the driven wheel speed. In addition, on the uphill/downhill running, when the inclination of the vehicle in the lengthwise direction affects the detected value of the longitudinal acceleration sensor, the decision of abnormality is not made so that the erroneous decision due to the uphill/downhill running can be avoided.

What is claimed is:

1. An abnormality determining device for a longitudinal acceleration sensor for a vehicle comprising:

a first acceleration estimating unit for estimating a vehicle acceleration based on a wheel speed;

a second acceleration estimating unit for estimating another vehicle acceleration based on the throttle angle of an engine;

a determination-permission deciding unit for setting a determination-permission region based on the estimated values of the first and second acceleration estimating unit so as to output a determination-permission signal when a deviation between the vehicle acceleration estimated by the first acceleration estimating unit and the vehicle acceleration estimated by the second acceleration estimating unit is within a predetermined value; and a determining unit for setting an abnormality determining region based on the vehicle acceleration estimated by the second acceleration estimating unit and for determining that the longitudinal acceleration sensor is abnormal, if the output value of the longitudinal acceleration sensor exists in the abnormality determining region for a predetermined time or longer in a state that the determination-permission deciding unit outputs a determination-permission signal.

2. An abnormality determining method for a longitudinal acceleration sensor for a vehicle comprising steps of:

estimating a first vehicle acceleration based on a wheel speed;

estimating a second vehicle acceleration based on the throttle angle of an engine;

outputting a determination-permission signal when a deviation between the first vehicle acceleration and the second vehicle acceleration is within a predetermined value;

setting a determination-permission region based on the first and second vehicle acceleration;

setting an abnormality determining region based on the second vehicle acceleration; and determining that the longitudinal acceleration sensor is abnormal, if the output value of the longitudinal acceleration sensor exists in the abnormality determining region for a predetermined time or longer in a state that a determination-permission signal is output.

* * * * *